(12) United States Patent
Horii (10) Patent No.: US 7,108,027 B2
(45) Date of Patent: Sep. 19, 2006

(54) FUEL CELL VEHICLE

(75) Inventor: Yoshiyuki Horii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/998,231

(22) Filed: Nov. 5, 2004

(65) Prior Publication Data

US 2005/0133283 A1 Jun. 23, 2005

(30) Foreign Application Priority Data

Nov. 19, 2003 (JP) ............................. 2003-388734

(51) Int. Cl.
*B65B 1/04* (2006.01)

(52) U.S. Cl. ................. 141/311 A; 141/286; 180/65.1; 280/834; 280/835

(58) Field of Classification Search ............ 141/311 A, 141/286; 429/34; 180/65.1, 219; 280/834, 280/835

See application file for complete search history.

(56) References Cited

U.S. PATENT DOCUMENTS

| | | | |
|---|---|---|---|
| 5,701,928 A * | 12/1997 | Aoki ........................... | 137/312 |
| 6,536,722 B1 * | 3/2003 | Sadowski et al. ........... | 248/154 |
| 6,557,596 B1 * | 5/2003 | Ono et al. ............... | 141/311 A |
| 6,564,833 B1 * | 5/2003 | Ono et al. .................... | 141/86 |
| 6,782,914 B1 * | 8/2004 | Kami et al. ................. | 137/312 |
| 2002/0092562 A1 * | 7/2002 | Kami et al. ................. | 137/312 |
| 2005/0133283 A1 * | 6/2005 | Horii .......................... | 180/65.1 |

FOREIGN PATENT DOCUMENTS

JP  2001-130468  5/2001

* cited by examiner

*Primary Examiner*—J. Allen Shriver
(74) *Attorney, Agent, or Firm*—Hamre, Schumann, Mueller & Larson, P.C.

(57) ABSTRACT

In a fuel cell vehicle on which a fuel cylinder is mounted, high-pressure fuel gas discharged to the air through a pressure control valve from the fuel cylinder is efficiently diffused and discharged to the outside of the vehicle.

9 Claims, 10 Drawing Sheets

FUEL CELL VEHICLE

FIELD OF THE INVENTION

The present invention relates to a fuel cell vehicle which includes a fuel cylinder and a fuel cell stack, and runs by electric power obtained by supplying reactive gas and fuel gas from the fuel cylinder to the fuel cell stack. The present invention relates to a fuel cell vehicle suitable for application to, for example, two-wheeled, three-wheeled or four-wheeled vehicles and the like.

BACKGROUND OF THE INVENTION

In recent years, there has been known a fuel cell vehicle which supplies electric power generated by a fuel cell system to a motor and drives wheels by this motor. For example, Japanese Patent Laid-Open No. 2001-130468 (FIG. 1) discloses a fuel cell system providing electric power generation in a fuel cell stack by a chemical reaction between hydrogen as fuel gas and oxygen as reactive gas. Here, oxygen is taken in from the air through an air compressor, and hydrogen is supplied from a fuel cylinder through a flow regulating valve.

For the purpose of extending mileage for one fuel gas supply, and the like, the fuel cylinder mounted on the fuel cell vehicle is filled with high-pressure hydrogen gas. In the fuel cylinder filled with the high-pressure hydrogen gas, besides the flow regulating valve, a pressure control valve is provided to prevent an internal gas pressure from being a certain gas pressure or more.

When the pressure control valve is actuated to discharge the hydrogen gas from the fuel cylinder to the air, it is preferable that the hydrogen gas is discharged to the air, in other words, to the outside of the vehicle while the discharge pressure is lowered and the fuel gas is diffused.

However, in the above-described document related to the prior art, there is no description as to how to discharge the hydrogen gas by use of the pressure control valve itself and by operation thereof.

The present invention was made in consideration for the foregoing problem. It is an object of the present invention to provide a fuel cell vehicle on which a fuel cylinder is mounted, which is capable of efficiently diffusing fuel gas discharged to the air from the fuel cylinder and discharging the fuel gas to the outside of the vehicle.

SUMMARY OF THE INVENTION

A fuel cell vehicle according to the present invention, which includes a fuel cylinder and a fuel cell stack, and runs by electric power obtained by supplying reactive gas and fuel gas from the fuel cylinder to the fuel cell stack, includes: a vehicle body frame which surrounds and supports the fuel cylinder, when planarly viewed; a gas discharger provided on the fuel cylinder, and a gas discharge port on the gas discharger and discharges the fuel gas in the fuel cylinder to the air through the gas discharge port. In the fuel cell vehicle, the gas discharge port is disposed so as to face the vehicle body frame.

Since the gas discharge port is disposed so as to face the vehicle body frame, the fuel gas discharged from the fuel cylinder can be efficiently diffused and discharged to the outside of the vehicle by allowing the fuel gas to hit against the vehicle body frame.

In this case, by further providing a diffusion guide, in the vehicle body frame disposed so as to face the gas discharge port, for diffusing the fuel gas discharged from the gas discharge port into a plurality of directions, the fuel gas can be efficiently diffused by the diffusion guide.

Moreover, a concave part facing the gas discharge port may be formed in the diffusion guide, and a plurality of openings through which a part of the fuel gas passes may be provided in the concave part. Accordingly, the discharged fuel gas is diffused through the concave part, hits against the vehicle body frame through the openings and is diffused by the vehicle body frame. Thus, the fuel gas can be more efficiently diffused.

Note that the fuel cell vehicle of the present invention may include a vehicle body cover which covers the vehicle body frame surrounding and supporting the fuel cylinder. In addition, an opening for discharging the fuel gas diffused by the vehicle body frame or the diffusion guide to the air outside of the vehicle body cover may be provided near the vehicle body frame against which the fuel gas hits or the diffusion guide in the vehicle body cover. Thus, the fuel gas diffused by the vehicle body frame, the fuel gas diffused by the diffusion guide or the fuel gas diffused by both of the diffusion guide and the vehicle body frame can be efficiently discharged to the outside of the vehicle from the opening of the vehicle body cover.

The gas discharger may be a pressure control valve which discharges the fuel gas by automatically opening the discharge port when a fuel gas pressure in the fuel cylinder exceeds a predetermined value. In the pressure control valve, a spring tension and the internal fuel gas pressure is oppositely applied to the valve body, and the pressure control valve has a function of opening the valve body and releasing an excess pressure to the air when the fuel gas pressure exceeds the spring tension. Thus, it is possible to prevent the pressure in the fuel cylinder from increasing more than necessary.

Accordingly, in the fuel cell vehicle on which the fuel cylinder is mounted, by allowing the fuel gas discharged from the fuel cylinder through the gas discharge port of the gas discharger to hit against the vehicle body frame or the diffusion guide, the fuel gas can be efficiently diffused and discharged to the outside of the vehicle.

DETAILED DESCRIPTION OF THE INVENTION

With reference to the drawings, an embodiment of the present invention will be described below.

Figure 1:
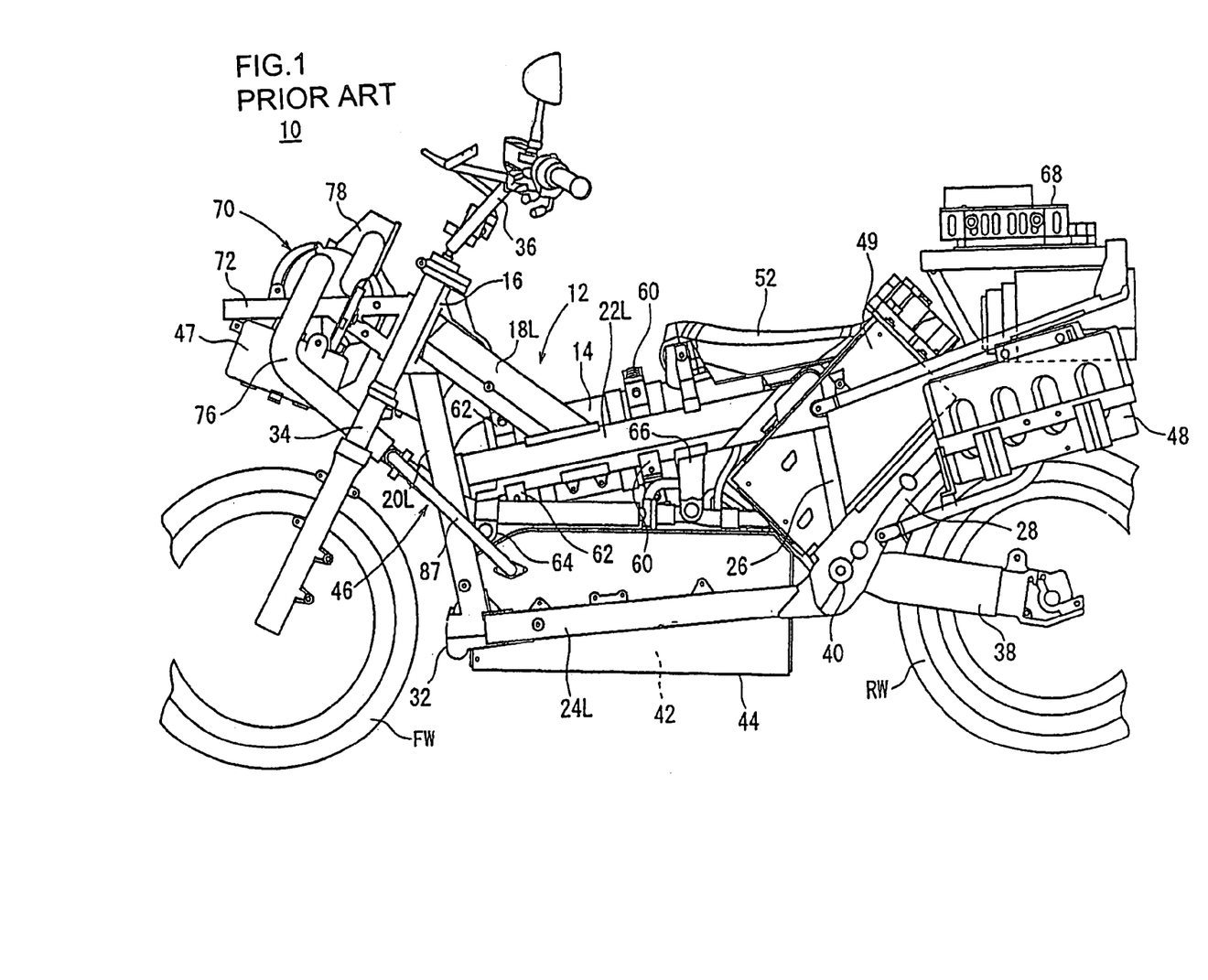
FIG. 1 is a partially omitted side view of a fuel cell motorcycle according to an embodiment of the present invention.
Figure 2:
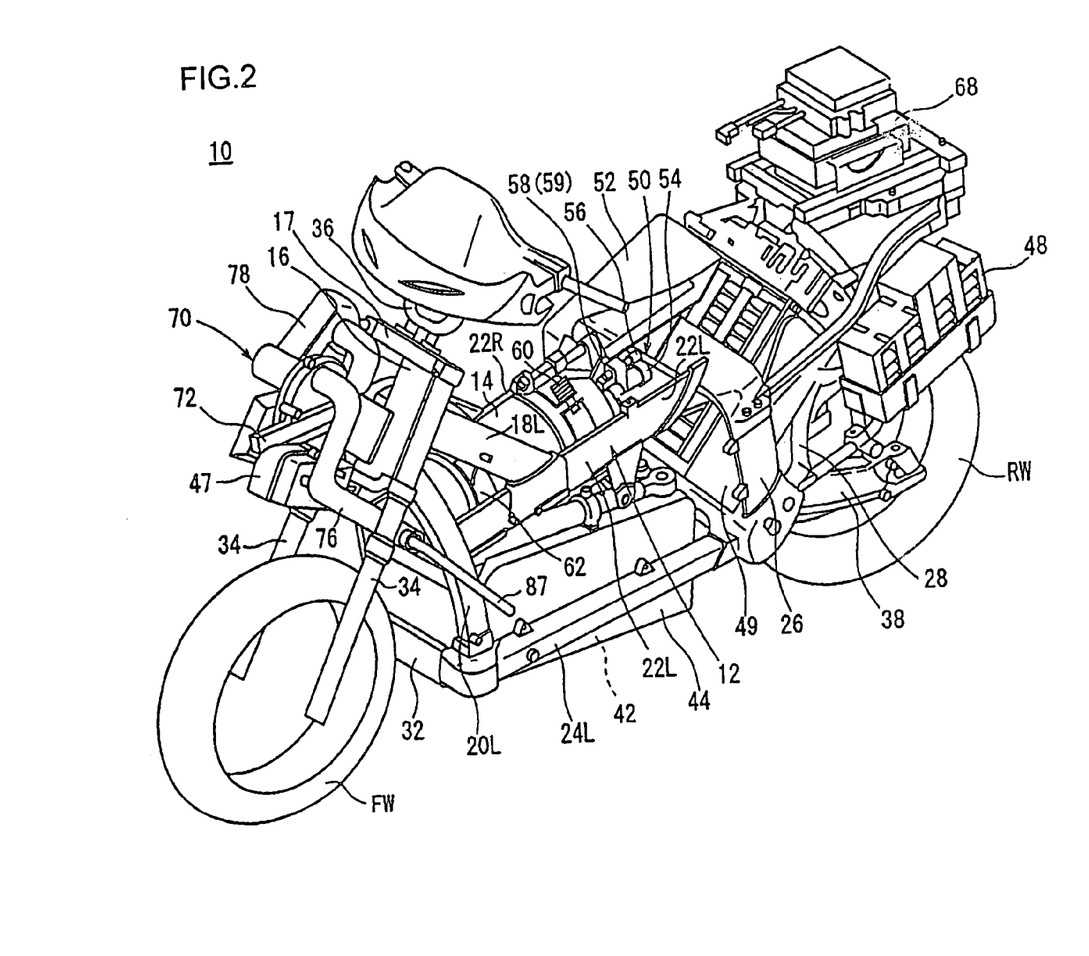
FIG. 2 is a partially omitted perspective view of the fuel cell motorcycle according to the embodiment shown in FIG. 1.
Figure 3:
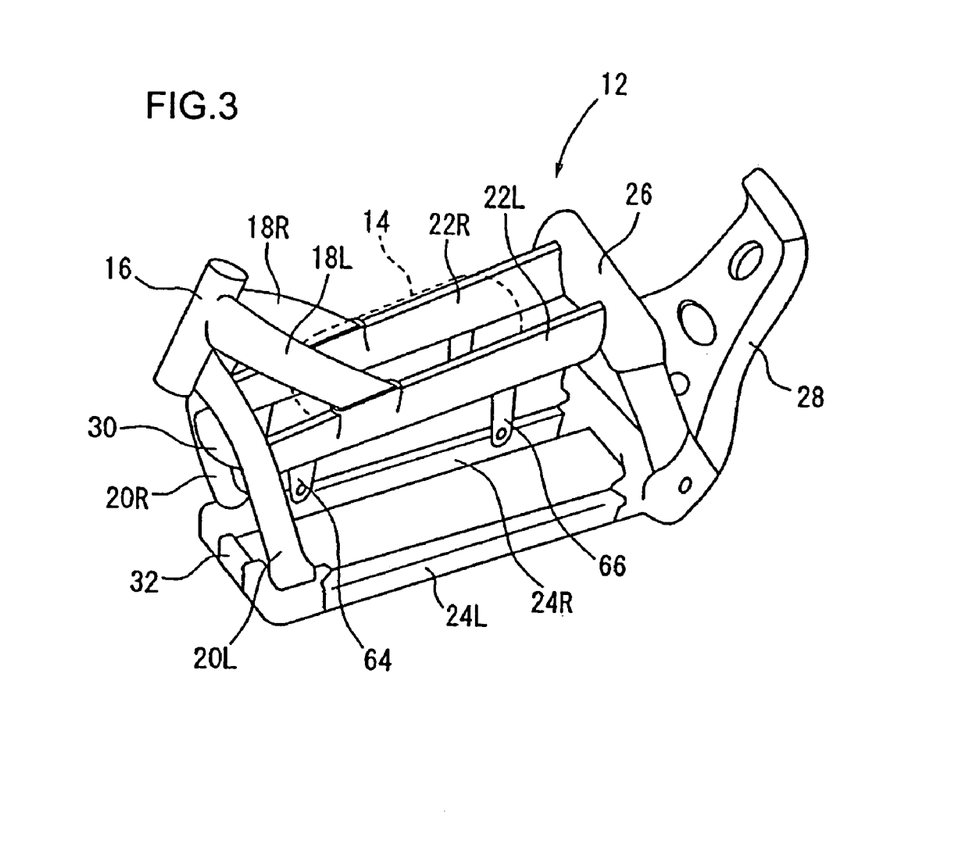
FIG. 3 is a schematic diagram of a vehicle body frame structure.
Figure 4:
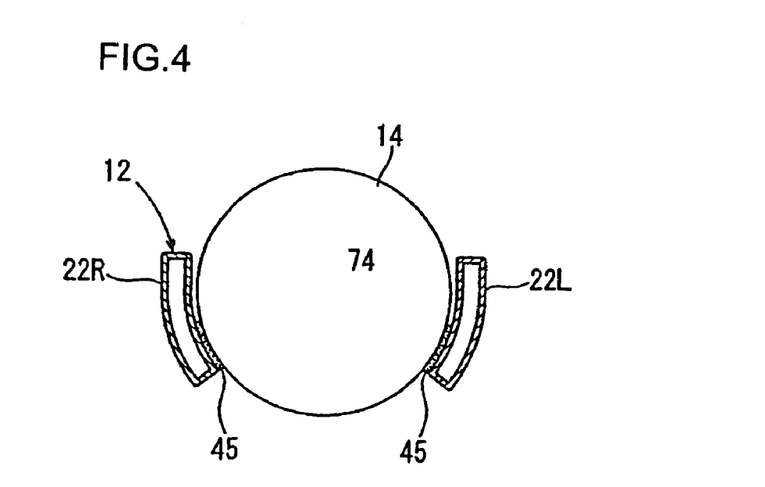
FIG. 4 is a front view showing a fuel cylinder and upper frames supporting the fuel cylinder.

FIG. 1 is a partially omitted side view showing a configuration of a fuel cell motorcycle 10 to which an embodiment of a fuel cell vehicle of the present invention is applied. FIG. 2 is a perspective view of the fuel cell motorcycle 10. FIG. 3 is a schematic diagram showing a framework of a vehicle body frame 12 of the fuel cell motorcycle 10. FIG. 4 is an explanatory diagram showing a state where the vehicle body frame 12 supports a fuel cylinder 14.

As mainly shown in FIG. 3, the vehicle body frame 12 basically includes: a head pipe 16; a pair of left and right upper down frames 18L and 18R which extend obliquely downward from the head pipe 16 as a starting point (one ends); a pair of left and right lower down frames 20L and 20R which extend downward from the head pipe 16 as a starting point (upper ends) below the upper down frames 18L and 18R; a pair of left and right upper frames 22L and 22R which extend obliquely upward from approximately the center of the lower down frames 20L and 20R and have the other ends of the upper down frames 18L and 18R connected in the middle thereof; a pair of left and right lower frames 24L and 24R which extend backward from lower ends of the lower down frames 20L and 20R below the upper frames 22L and 22R; a annular frame 26 which has an approximately square ring-like structure and supports, with its four corners, rear ends of the upper frames 22L and 22R and the lower frames 24L and 24R; and an upper connection frame 30 and a lower connection frame 32, which connect the lower down frames 20L and 20R, respectively, at positions where the upper frames 22L and 22R and the lower frames 24L and 24R are connected thereto.

The vehicle body frame 12 further includes a rear plate 28 which extends obliquely upward from the rear ends of the lower frames 24L and 24R.

As mainly shown in FIG. 1, a pair of left and right front forks 34 which support a front wheel FW so as to be rotatable through a bridge 17 are connected to the head pipe 16. A steering wheel 36 is connected to the front forks 34 so as to be steerable through the bridge 17. Below the rear plate 28, a pair of left and right swinging frames 38 are supported so as to be swingable by use of a shaft 40 as a supporting point, and a rear wheel RW as a driving wheel is supported at rear ends of the swinging frames 38. Note that, in the rear wheel RW, a motor (not shown) which is driven by electric power generated in a fuel cell system is integrally included.

The fuel cell system is included in the fuel cell motorcycle 10. This fuel cell system basically includes: a fuel cell stack 42 which generates electricity (currents) by reaction between fuel gas (hydrogen gas) supplied to an anode electrode and reactive gas (oxygen gas) supplied to a cathode electrode; a fuel cell box 44 which has the fuel cell stack 42 built-in; a fuel cylinder (hydrogen cylinder) 14 which stores the fuel gas to be supplied to the fuel cell stack 42 in the fuel cell box 44 in a high pressure state; and a piping system 46 which takes in the outside air (air) to be supplied into the fuel cell box 44 as the reactive gas, scavenging gas and coolant gas. The fuel cell system further includes, as auxiliary power, a plurality of secondary batteries 47 and 48 and a fuel cell 49.

The fuel cylinder 14 is mounted on a front side of a driver seat 52 along the left and right upper frames 22L and 22R so as to be supported by the upper frames 22L and 22R therebetween. Specifically, the fuel cylinder 14 is mounted in a reclined posture in which a valve assembly 50 faces the rear and an end (front end) of the fuel cylinder on the valve assembly 50 is higher than the other end (rear end) thereof. Note that the valve assembly 50 provided in the fuel cylinder 14 includes: a shut-off valve 54 to which high-pressure hydrogen is supplied in a hydrogen fuel station and the like; a flow regulating valve 56 which regulates a flow rate of the fuel gas supplied to the fuel cell stack 42; and a pressure control valve 58 as a gas discharger having a gas discharge port 59, which is automatically released when an internal gas pressure reaches a certain gas pressure or more.

As shown in FIG. 4, the left and right upper frames 22L and 22R are formed in such a manner that a space between the both becomes narrower in a lower portion than an upper portion. Thus, the fuel cylinder 14 can be supported in the reclined posture. On contact surfaces of the upper frames 22L and 22R, a shock absorbing member 45 is attached. Note that surfaces of the upper frames 22L and 22R, which support the fuel cylinder 14, have an approximately plate shape. The fuel cylinder 14 is firmly held by the upper frames 22L and 22R by use of tying metal bands 60 and 62 (see FIGS. 1 and 2).

In the state where the fuel cylinder 14 is held by the upper frames 22L and 22R, as indicated by the dotted line in FIG. 3, the fuel cylinder 14 is disposed in an axle direction, when planarly viewed, and front and back sides of the fuel cylinder 14 are protected by an upper side of the annular frame 26 and the upper connection frame 30, respectively. Moreover, left and right sides of the fuel cylinder 14 are protected by the upper frames 22L and 22R. Specifically, when planarly viewed, the fuel cylinder 14 is surrounded and protected by a thick band-like frame including the upper side of the annular frame 26, the upper connection frame 30 and the upper frames 22L and 22R, all of which form the vehicle body frame 12. Moreover, the fuel cylinder 14 is firmly supported by the upper frames 22L and 22R by use of the tying bands 60 and 62 (see FIGS. 1 and 2).

Below the fuel cylinder 14, the fuel cell box 44 is fixed and suspended by brackets 64 and 66 provided in four spots (two in each of the front and the rear) of the upper frames 22L and 22R so that the fuel cell box 44 is positioned between the lower frames 24L and 24R, and is in parallel with a straight line connecting a rotation axis of the front wheel FW and overlaps this straight line.

The secondary batteries 47 and 48 and the fuel cell 49, as the auxiliary power source, are dispersedly located in the front of the vehicle, in the rear of the vehicle and below the seat 52, respectively. In the back of the seat 52, an electric component 68 is mounted, which includes a downverter for converting an output voltage of the fuel cell system into a voltage for an auxiliary machine, for example, 12 [V], and an ECU (Electric Control Unit) for controlling the entire fuel cell motorcycle 10.

Moreover, in the front of the vehicle body, a blower module 70 is attached to a front pipe 72 extending toward the front from the head pipe 16, the blower module 70 functioning as an air compressor for taking in the air and forcibly supplying the air, as the scavenging gas, the reactive gas and the coolant gas, to the fuel cell box 44.

Figure 5:
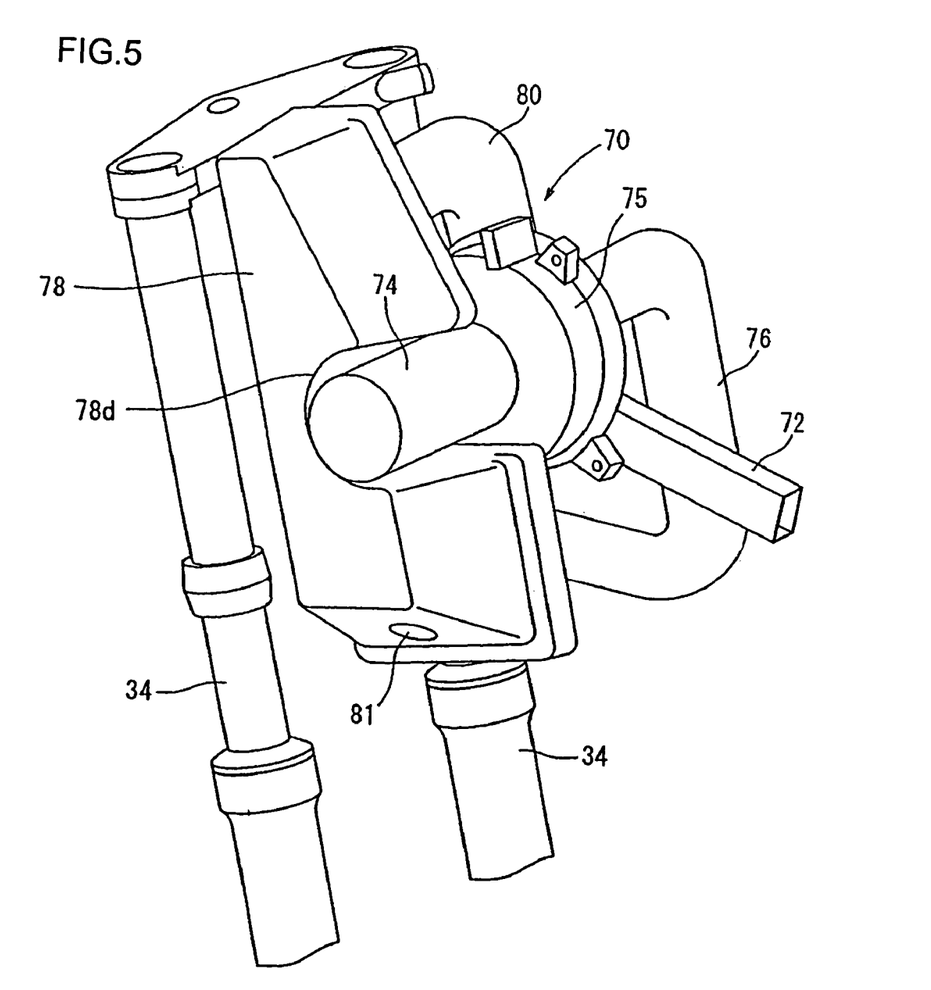
FIG. 5 is a partially omitted perspective view of a blower module when viewed from diagonally right front of the vehicle body.
Figure 6:
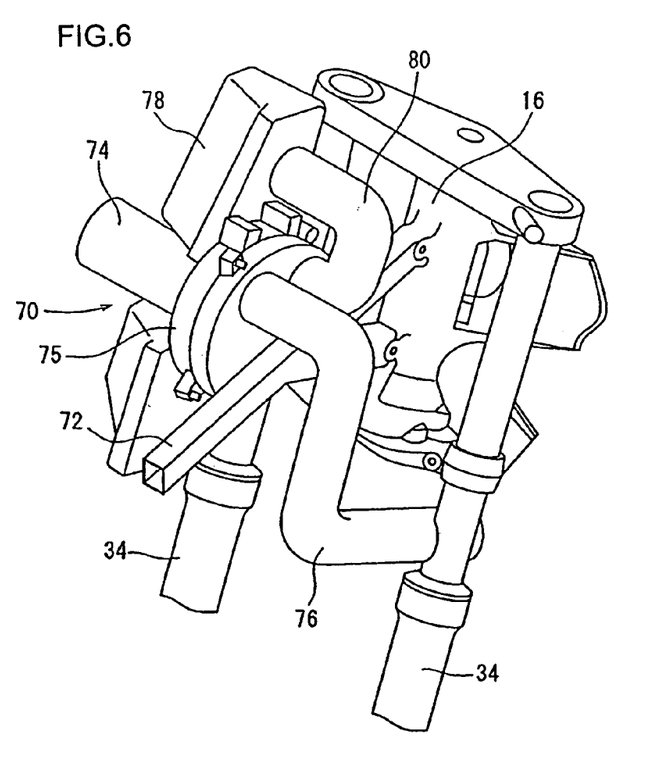
FIG. 6 is a partially omitted perspective view of the blower module when viewed from diagonally left front of the vehicle body.

FIG. 5 is a diagram showing the blower module 70 when viewed from diagonally right front of the vehicle body. FIG. 6 is a diagram showing the blower module 70 when viewed from diagonally left front of the vehicle body.

The blower module 70 basically includes: a blower main body 75 having a blower motor 74 and a blower fan (not shown), which are controlled by the electric component 68; an air cleaner 78; and a suction pipe 80 which connects the blower main body 75 and the air cleaner 78 to each other.

Figure 7:
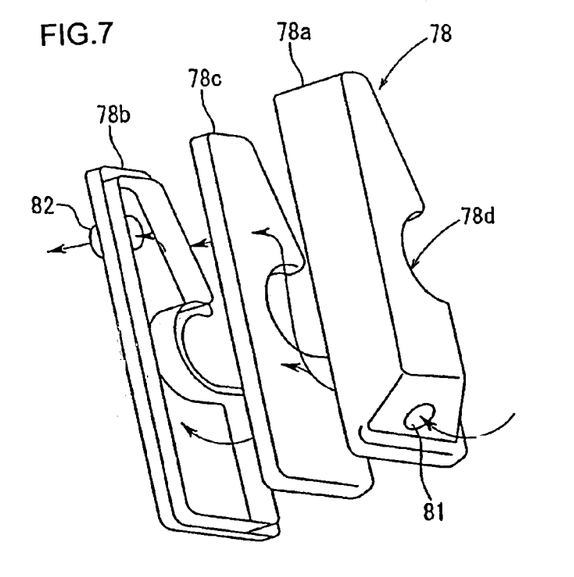
FIG. 7 is an exploded perspective view of an air cleaner.

As shown in FIG. 7, the air cleaner 78 includes an air filter 78c in a case constituted of a right case 78a and a left case 78b. In a lower end surface of the right case 78a, an inlet port 81 for taking in the air is provided, and in a principal surface of the left case 78b, an outlet port 82 is provided. The suction pipe 80 is connected to the outlet port 82.

As shown in FIG. 5, the air cleaner 78 is attached to the vehicle body in a state where the inlet port 81 is directed downward and diagonally right from the vehicle body. In a side of the air cleaner 78, a notch part 78d is provided, and in this notch part 78d, the blower motor 74 of the blower main body 75 is housed.

When the blower main body 75 is operated, the pressure in the suction pipe 80 becomes a negative pressure and the air is sucked in from the inlet port 81 of the air cleaner 78. This air is filtered through the air filter 78c in the air cleaner 78 and, thereafter, is sucked into the suction pipe 80 from the outlet port 82. Subsequently, the air is supplied to a fan duct 76 through the blower motor 74.

When an unillustrated ignition switch is turned on, the blower module 70 is driven, and suction and pressure feed of the air are started.

Figure 8:
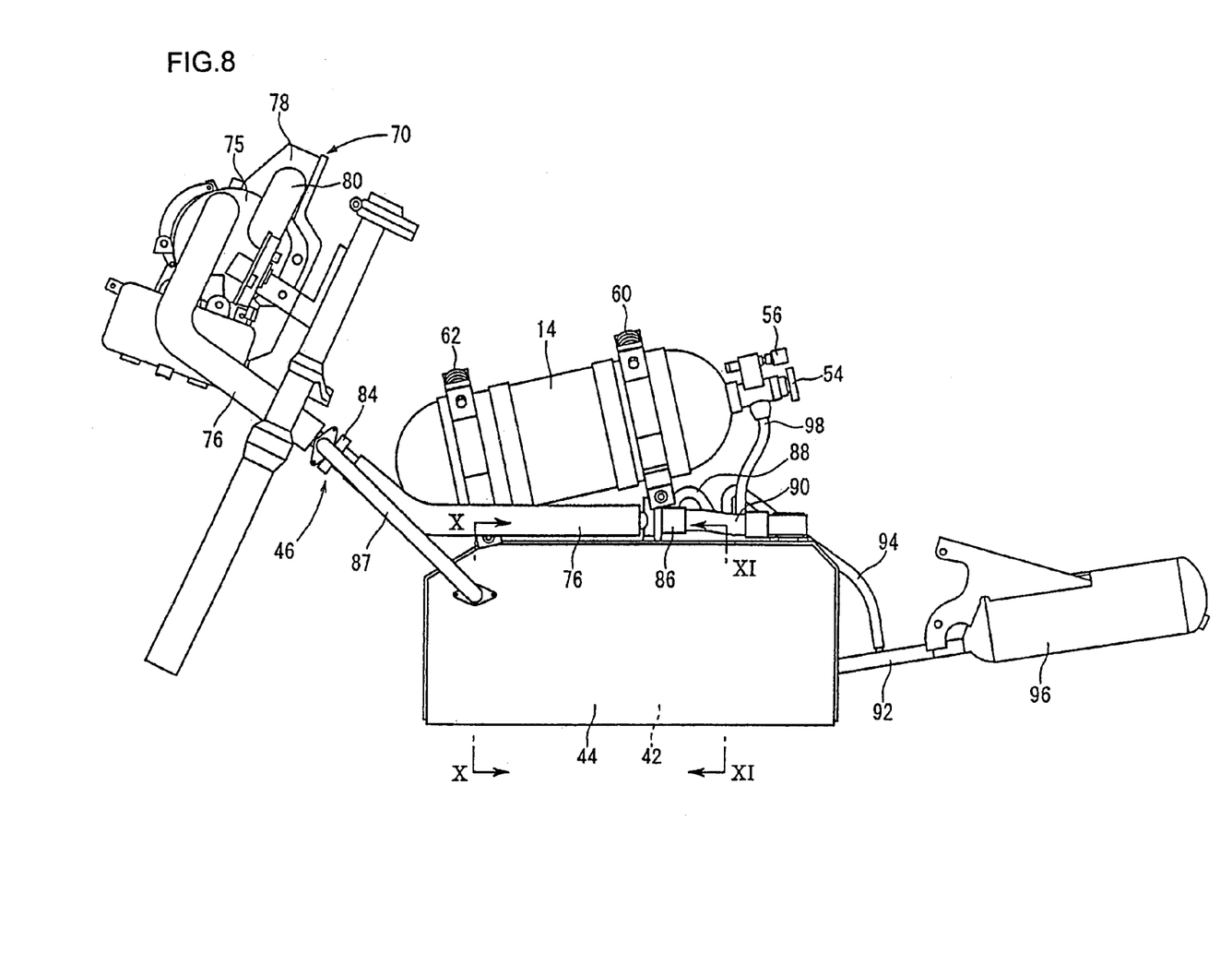
FIG. 8 is a side view showing a configuration of a fuel cell system.

In this case, as shown in FIG. 8, the air is introduced, as the scavenging gas, into the fuel cell box 44 through a scavenging gas supply path 87 from an upstream by-pass valve 84 of the fan duct 76. At the same time, since a downstream by-pass valve 86 is opened, the air is supplied to the fuel cell stack 42 through a reactive gas supply path 88 (also see FIG. 9) and through a coolant gas supply path 90.

In this event, a stack temperature Tbat of the fuel cell stack 42 is constantly measured by an unillustrated temperature sensor. When the ignition switch is turned off, the stack temperature Tbat is compared with a predetermined reference temperature Tref. The downstream by-pass valve 86 is controlled in the following manner. Specifically, if Tbat<Tref, the air supplied from the fan duct 76 is supplied to neither the reactive gas supply path 88 nor the coolant gas supply path 90, and if Tbat≧Tref, the supply of the air to the reactive gas supply path 88 is stopped and only the supply thereof to the coolant gas supply path 90 is continued.

To the fuel cell box 44, a scavenging gas outlet path 92 for discharging the scavenging gas and a hydrogen outlet path 94 for discharging purged fuel gas (hydrogen gas) are further connected. Other ends of the respective paths are connected to a silencer 96 which also functions as a dilution box for hydrogen. The scavenging gas and the purged hydrogen gas are mixed by the silencer 96 and discharged to the air.

As shown in FIG. 8, the fuel cylinder 14 and the fuel cell box 44 are connected to each other by a fuel gas supply path 98, and through this fuel gas supply path 98, the fuel gas is supplied to the fuel cell stack 42 in the fuel cell box 44 from the fuel cylinder 14. Voltages of respective cells included in the fuel cell stack 42 are constantly monitored, and if even one of the voltages falls below a reference voltage, hydrogen purging for securing predetermined power generation efficiency or more is performed.

Figures 9, 10:
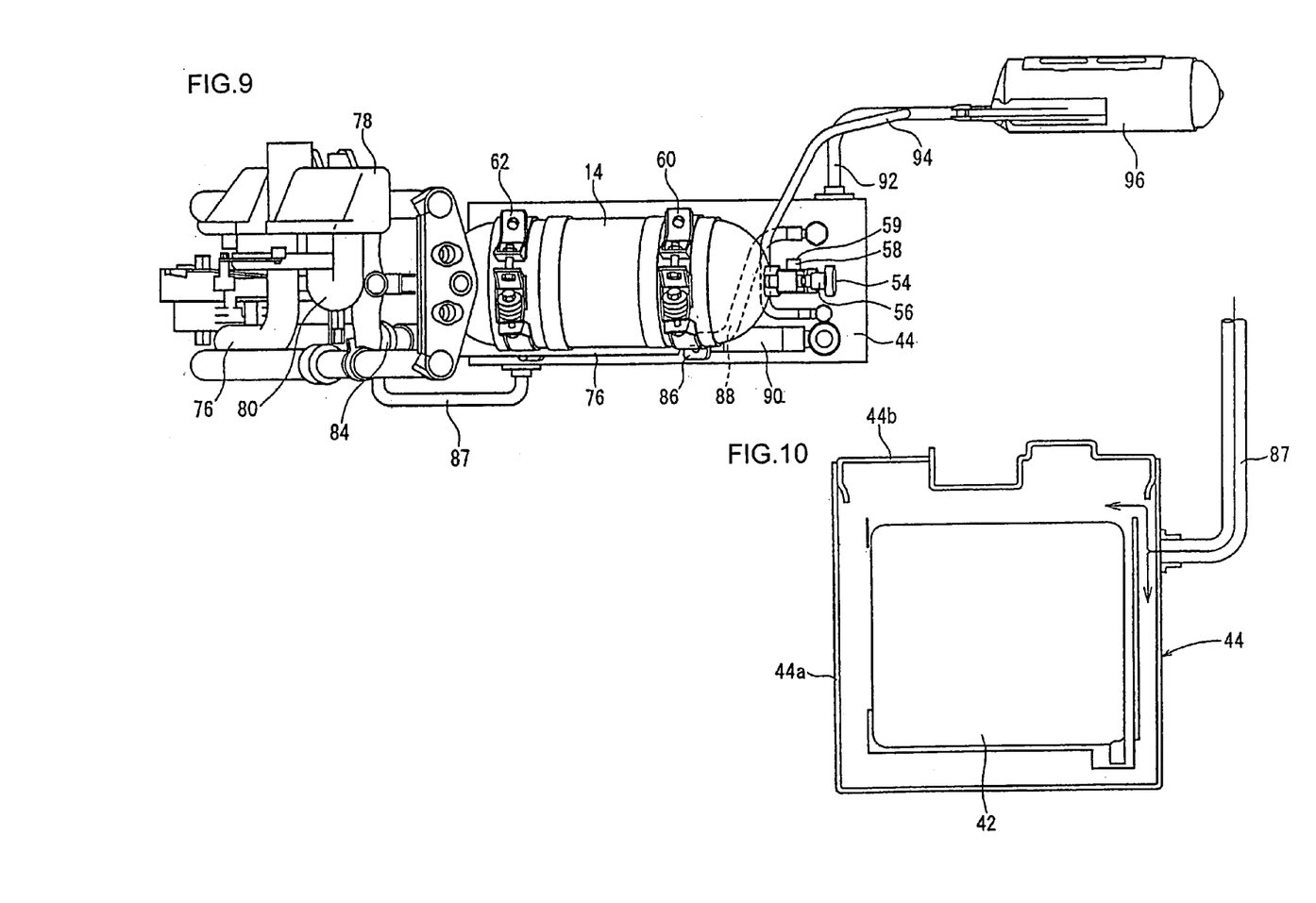
FIG. 9 is a plan view showing the configuration of the fuel cell system.
FIG. 10 is a cross-sectional view along the line X—X of a fuel cell box.
Figures 11, 12:
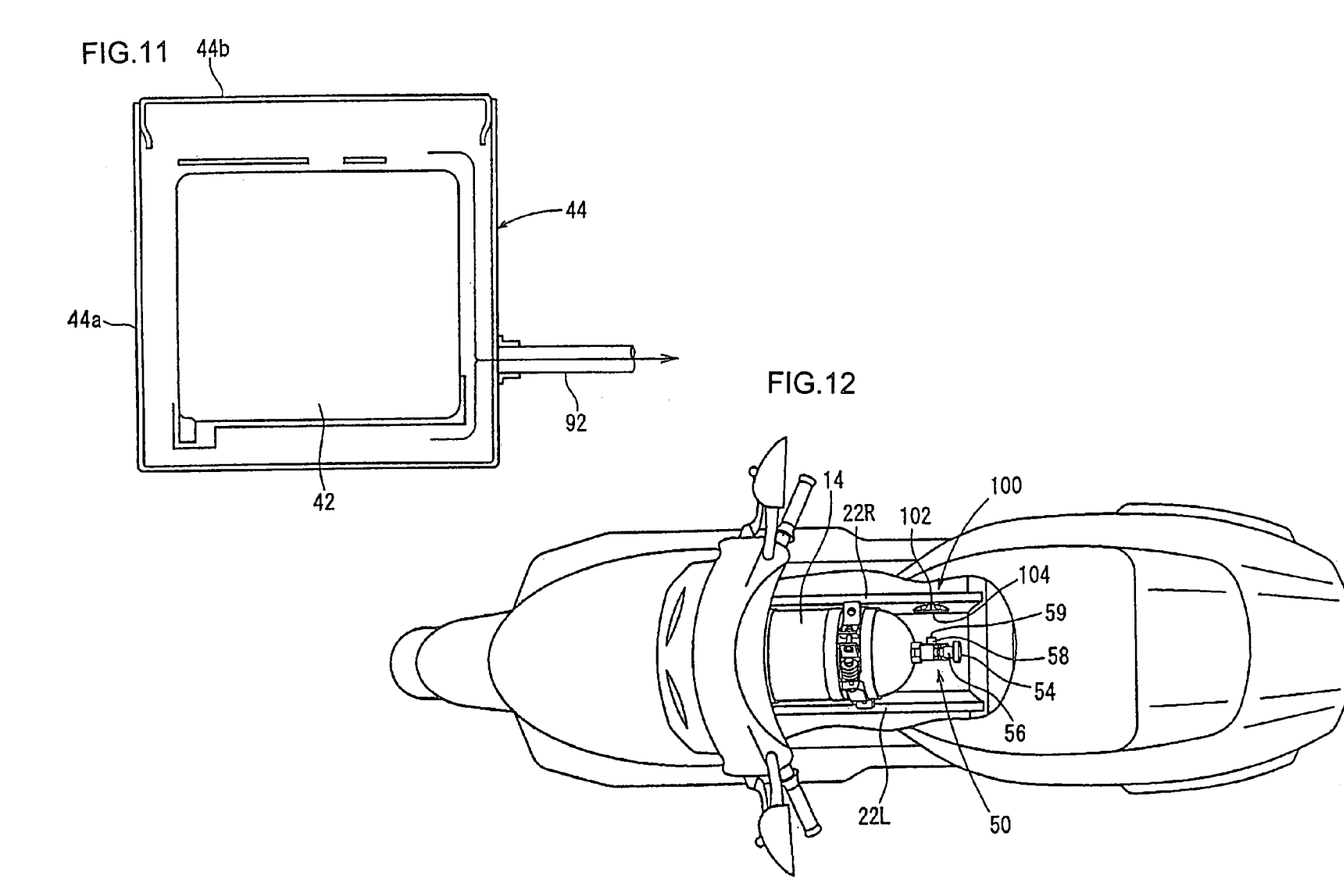
FIG. 11 is a cross-sectional view along the line XI—XI of the fuel cell box.
FIG. 12 is a plan view for explaining the arrangement of the gas diffusion mechanism.

FIGS. 10 and 11 are cross-sectional views of the fuel cell box 44 along the line X—X and the line XI—XI, respectively.

In the fuel cell box 44, the approximately cuboid fuel cell stack 42 is supported in such a manner that a space for scavenging is secured between six faces thereof and box cases 44a and 44b. The air introduced as the scavenging gas into the fuel cell box 44 from the scavenging gas supply path 87 is discharged from the scavenging gas outlet path 92 after scavenging the gas staying in the space between the box cases 44a and 44b and the fuel cell stack 42.

Figure 13:
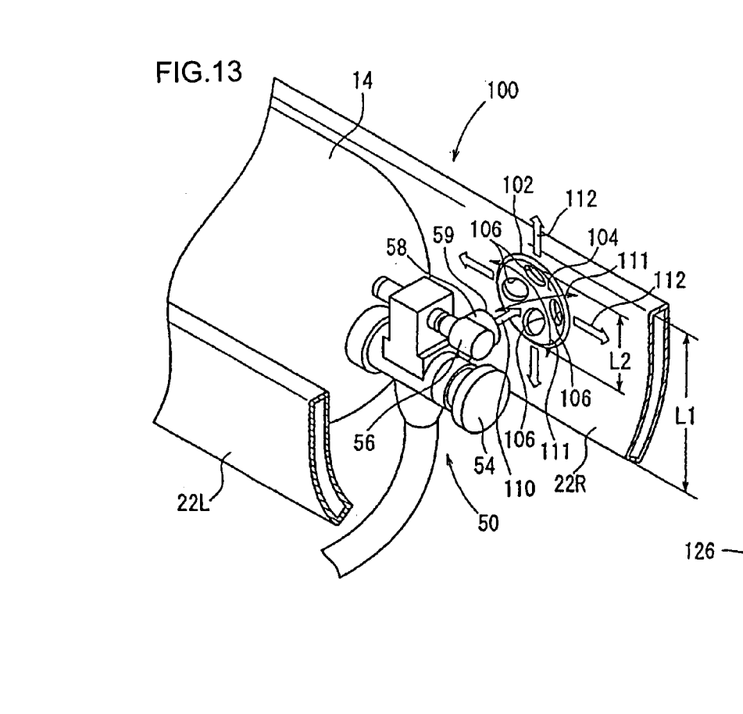
FIG. 13 is a perspective view for explaining arrangement and operations of a gas diffusion mechanism.

FIG. 13 is a perspective view schematically showing a configuration of a gas diffusion mechanism 100 which includes the valve assembly 50 forming the fuel cylinder 14, and the upper frames 22L and 22R in the vehicle body frame 12.

FIG. 12 is a schematic plan view for explaining the gas diffusion mechanism 100.

The gas diffusion mechanism 100 includes the pressure control valve 58, a diffusion guide 102 and the upper frame 22R included in the vehicle body frame 12. Here, the pressure control valve 58 as the gas discharger, which is attached to the valve assembly 50 of the fuel cylinder 14, includes the gas discharge port 59, and this gas discharge port 59 is disposed so as to face the diffusion guide 102 provided in the upper frame 22R.

The diffusion guide 102 has a bowl shape, and a surface facing the gas discharge port 59 is formed to be a concave part 104. In four spots of this concave part 104, openings 106 are provided. The openings 106 are opened along a direction in parallel with the upper frame 22R and along a direction orthogonal thereto. Here, a diameter L2 of the diffusion guide 102 is larger than that of the gas discharge port 59. To be more specific, a size of the diffusion guide 102 is set to such a size that the high-pressure fuel gas discharged from the cone-shaped gas discharge port 59 is diffused after always hitting against the diffusion guide 102. A width L1 of an attachment surface for the diffusion guide 102 in the upper frame 22R is larger than the maximum diameter L2 of the diffusion guide 102.

Note that the diffusion guide 102 is screwed on a boss provided in the upper frame 22R through the bowl-shaped bottom thereof, for example. The diffusion guide 102 may have a configuration in which the diffusion guide 102 is fixed to two bosses by use of two screws and thus the rotation thereof is prevented. Moreover, the following configuration can be also adopted. Specifically, a screw-like protrusion having an irregular shape, such as a screw having a square head, is provided in the upper frame 22R, and this screw-like protrusion is pressed into a concave part which is provided in the bottom of the diffusion guide 102 and has a shape corresponding to the screw having the irregular shape. Thus, the diffusion guide 102 is fixed through one-touch operation.

The pressure control valve 58 is a pressure control valve for limiting the maximum pressure of the fuel cylinder 14. In the pressure control valve 58, for example, a spring tension and the internal fuel gas pressure is oppositely applied to the valve body, and the pressure control valve 58 has a function of opening the valve body and discharging the part of the fuel gas equivalent to an excess pressure through the gas discharge port 50 as indicated by the arrow 110 when the internal fuel gas pressure exceeds the spring tension.

The high-pressure fuel gas discharged in the direction of the arrow 110 from the gas discharge port 59 has its pressure weakened when hitting against the concave part 104 of the diffusion guide 102. Moreover, the fuel gas has its pressure further weakened when being radially diffused as indicated by the arrow 111 along the concave part 104. Thereafter, the fuel gas is discharged to the air. A part of the gas passing through the diffusion guide 102 via the openings 106 hits against an approximately plate-like wall surface of the upper frame 22R and is further attenuated and rectified. Accordingly, the gas is diffused as indicated by the arrow 112 along the wall surface and is radially discharged to the air. As described above, the high-pressure fuel gas which has hit against the upper frame 22R and the diffusion guide 102 has its force attenuated and is diffused quickly and efficiently in respective directions.

Figure 14:
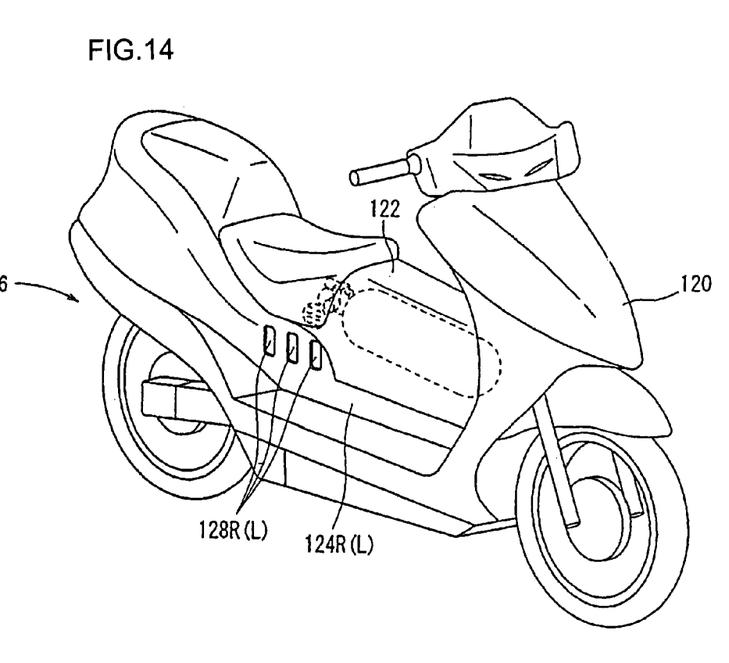
FIG. 14 is a perspective view of a fuel cell vehicle covered with a vehicle body cover.

In a practical sense, as shown in FIG. 14, the fuel cell motorcycle 10 is covered with a vehicle body cover 126 including a front cowl 120, a center cowl 122 and left and right side cowls 124L and 124R. Thus, by providing openings 128L and 128R in spots, where the fuel gas is diffused, in the vicinity of the diffusion guide 102 in the left and right side cowls 124L and 124R, the fuel gas diffused by the diffusion guide 102 and the upper frame 22R can be efficiently and quickly discharged to the outside of the vehicle.

Figure 15:
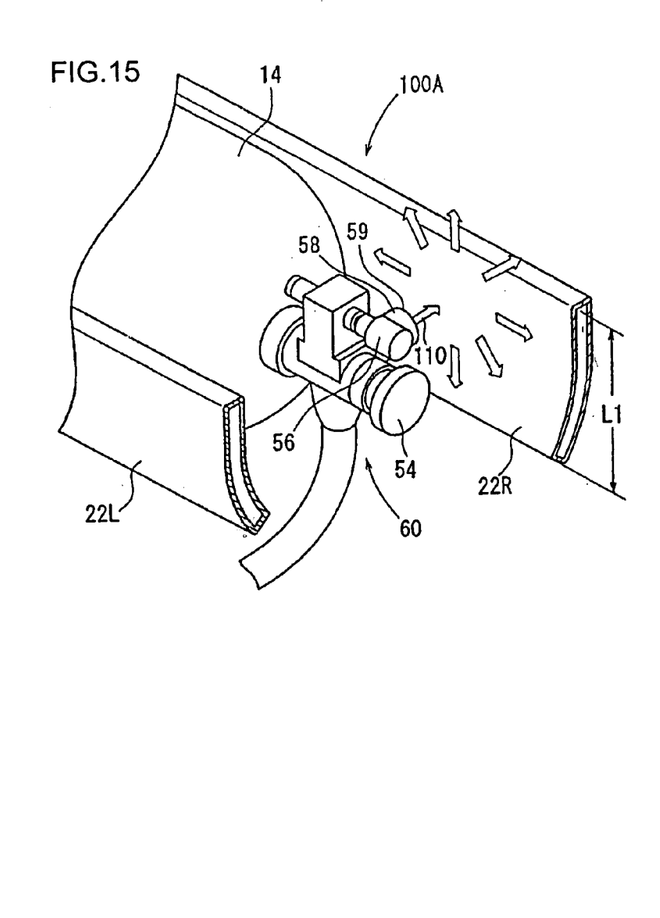
FIG. 15 is a perspective view for explaining arrangement and operations of a gas diffusion mechanism according to another embodiment.

Note that, as shown in FIG. 15, even if a gas diffusion mechanism 100A has a configuration in which, without the diffusion guide 102, the gas discharge port 59 of the pressure control valve 58 is disposed so as to directly face the wall surface of the upper frame 22R, the fuel gas discharged from the gas discharge port 59 hits against the upper frame 22R and is diffused in all directions as indicated by the arrows. Thus, a certain diffusion effect can be obtained. In this case, the width L1 of the upper frame 22R is set to such a width that the high-pressure fuel gas discharged from the gas discharge port 59 is diffused after always hitting against the upper frame 22R.

Figure 16:
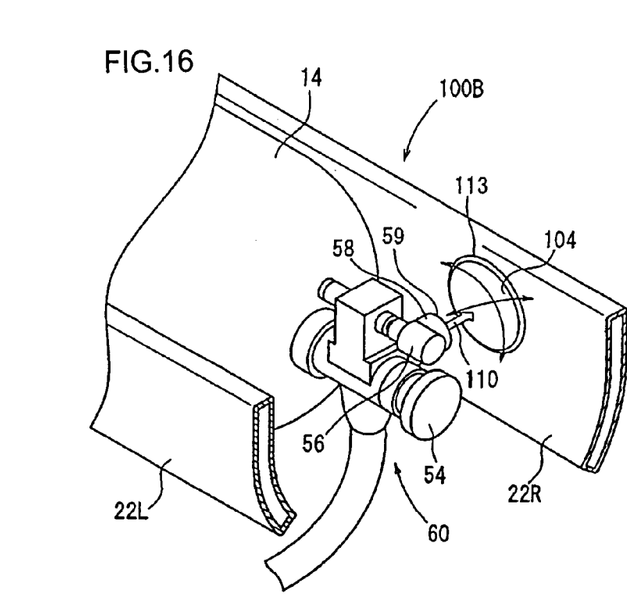
FIG. 16 is a perspective view for explaining arrangement and operations of a gas diffusion mechanism according to still another embodiment.

Moreover, as shown in FIG. 16, even if a gas diffusion mechanism 100B has a configuration in which a diffusion guide 113 having no openings 106 and using its entire surface as a concave part is disposed so as to face the gas discharge port 59, the fuel gas discharged from the gas discharge port 59 hits against the diffusion guide 113 and is diffused in all directions. Thus, a certain diffusion effect can be obtained.

In this case, in terms of comparative merits and demerits of the gas diffusion mechanisms 100, 100A and 100B, the most efficient diffusion is possible by use of the gas diffusion mechanism 100 in the example shown in FIG. 13, in which the diffusion guide 102 having the openings 106 is provided in the vehicle body frame (the upper frame 22R). After the above mechanism, the efficient diffusion is possible in the order: the gas diffusion mechanism 100B in the example shown in FIG. 16, in which the diffusion guide 113 having no openings is provided in the vehicle body frame (the upper frame 22R); and the gas diffusion mechanism 100A in the example shown in FIG. 15, in which the discharged gas is diffused only by the vehicle body frame (the upper frame 22R). Which one of the gas diffusion mechanisms 100, 100A and 100B to be used can be determined by taking into consideration the discharge pressure from the gas discharge port 59, the shape of the upper frame 22R and the like.

Note that the present invention is not limited to the embodiment described above. It is needless to say that, based on the description of the present specification, various configurations can be adopted. For example, the present invention is similarly applicable to a three-wheeled fuel cell vehicle and a four-wheeled fuel cell vehicle besides the fuel cell motorcycle 10.

I claim:

1. A fuel cell vehicle, which includes a fuel cylinder and a fuel cell stack, and runs by electric power obtained by supplying reactive gas and fuel gas from the fuel cylinder to the fuel cell stack, comprising:
   a vehicle body frame which surrounds and supports the fuel cylinder, said vehicle body frame having a frame member supporting the fuel cylinder along a side such that said member has a wall surface with a shape of approximately a plate;
   a gas discharger provided in the fuel cylinder; and
   a gas discharge port provided on the gas discharger wherein fuel gas in the fuel cylinder is discharged to the air through the gas discharge port and the gas discharge port is disposed so as to face to the side the plate wall surface of the frame member;
   wherein gas discharged through said gas discharge port is directed against said plate wall surface and diffused.

2. The fuel cell vehicle according to claim 1, further comprising:
   a diffusion guide in the vehicle body frame disposed so as to face the gas discharge port for diffusing the fuel gas discharged from the gas discharge port into a plurality of directions.

3. The fuel cell vehicle according to claim 2, wherein
   a concave part is formed on a surface facing the gas discharge port in the diffusion guide, and a plurality of openings through which a part of the fuel gas passes are provided in the concave part.

4. The fuel cell vehicle according to claim 1 further comprising:
   a vehicle body cover which covers the vehicle body frame surrounding and supporting the fuel cylinder,
   wherein an opening for discharging the fuel gas diffused by the vehicle body frame or the diffusion guide to the air outside of the vehicle body cover is provided near any of the vehicle body frame against which the fuel gas hits, and the diffusion guide in the vehicle body cover.

5. The fuel cell vehicle according to claim 1 wherein
   the gas discharger is a pressure control valve which discharges the fuel gas by automatically opening the gas discharge port when a fuel gas pressure in the fuel cylinder exceeds a predetermined value.

6. A fuel cell vehicle, which includes a fuel cylinder and a fuel cell stack, and runs by electric power obtained by supplying reactive gas and fuel gas from the fuel cylinder to the fuel cell stack, comprising:
   a vehicle body frame which surrounds and supports the fuel cylinder, when planarly viewed;
   a gas discharger provided in the fuel cylinder;
   a gas discharge port provided on the gas discharger wherein fuel gas in the fuel cylinder is discharged to the air through the gas discharge port and the gas discharge port is disposed so as to face the vehicle body frame; and
   a diffusion guide in the vehicle body frame disposed so as to face the gas discharge port for diffusing the fuel gas discharged from the gas discharge port into a plurality of directions.

7. The fuel cell vehicle according to claim 6, wherein
a concave part is formed on a surface facing the gas discharge port in the diffusion guide, and a plurality of openings through which a part of the fuel gas passes are provided in the concave part.

8. The fuel cell vehicle according to claim 6 further comprising:
a vehicle body cover which covers the vehicle body frame surrounding and supporting the fuel cylinder,
wherein an opening for discharging the fuel gas diffused by the vehicle body frame or the diffusion guide to the air outside of the vehicle body cover is provided near any of the vehicle body frame against which the fuel gas hits, and the diffusion guide in the vehicle body cover.

9. The fuel cell vehicle according to claim 6 wherein
the gas discharger is a pressure control valve which discharges the fuel gas by automatically opening the gas discharge port when a fuel gas pressure in the fuel cylinder exceeds a predetermined value.

* * * * *